(12) United States Patent
Olah et al.

(10) Patent No.: US 9,806,527 B1
(45) Date of Patent: Oct. 31, 2017

(54) INTEGRATED ELECTRONICS FOR PERPETUAL ENERGY HARVESTING

(71) Applicant: Banpil Photonics, Inc., Santa Clara, CA (US)

(72) Inventors: Robert Olah, Sunnyvale, CA (US); Achyut Kumar Dutta, Sunnyvale, CA (US)

(73) Assignee: Banpil Photonics, Inc., Santa Clara, CA (US)

(*) Notice: Subject to any disclaimer, the term of this patent is extended or adjusted under 35 U.S.C. 154(b) by 0 days.

(21) Appl. No.: 15/192,831

(22) Filed: Jun. 24, 2016

Related U.S. Application Data

(62) Division of application No. 14/341,475, filed on Jul. 25, 2014, now Pat. No. 9,401,613.

(51) Int. Cl.
*H02J 3/38* (2006.01)
*G05F 1/56* (2006.01)
*H02M 3/07* (2006.01)

(52) U.S. Cl.
CPC ............... *H02J 3/382* (2013.01); *G05F 1/56* (2013.01); *H02J 3/385* (2013.01); *H02M 3/07* (2013.01)

(58) Field of Classification Search
CPC . H02J 1/00; H02J 7/0055; H02J 3/385; G05F 1/56; H02M 3/07
USPC .......................................... 307/43, 45, 82, 18
See application file for complete search history.

(56) References Cited

U.S. PATENT DOCUMENTS

| | | | | |
|---|---|---|---|---|
| 2012/0292993 | A1* | 11/2012 | Mettler | ................ H02J 7/0055 307/25 |
| 2013/0113295 | A1* | 5/2013 | Dowlatabadi | ............. H02J 1/10 307/87 |
| 2013/0249300 | A1* | 9/2013 | Fishman | ........... H01L 31/02016 307/82 |

* cited by examiner

*Primary Examiner* — Robert Deberadinis

(57) ABSTRACT

An apparatus for perpetually harvesting ambient near ultraviolet to far infrared radiation to provide continual power regardless of the environment, incorporating a system for the harvesting electronics governing power management, storage control, and output regulation. The harvesting electronics address issues of efficiently matching the voltage and current characteristics of the different harvested energy levels, low power consumption, and matching the power output demand. The device seeks to harvest the largely overlooked blackbody radiation through use of a thermal harvester, providing a continuous source of power, coupled with a solar harvester to provide increased power output.

20 Claims, 7 Drawing Sheets

INTEGRATED ELECTRONICS FOR PERPETUAL ENERGY HARVESTING

PARENT CASE TEXT

This is a divisional of application(s) Ser. No. 14/341,475 filed on Jul. 25, 2014.

CROSS-REFERENCE TO RELATED APPLICATIONS

Not Applicable

STATEMENT REGARDING FEDERALLY SPONSORED RESEARCH AND DEVELOPMENT

This invention was made in part with Government support under contract no. W31P4Q10C0034 awarded by US Army Aviation and Missile Command. The Government has certain rights in the invention.

FIELD OF INVENTION

This invention pertains to the harvesting of ambient energy in the surrounding environment. More particularly this invention is related to a semiconductor perpetual energy harvesting and storage device and the harvesting electronics that control energy storage and output allowing the device to continually harvest and provide continuous power during both day and night in any environment.

BACKGROUND OF INVENTION

There are many sources of energy that can be converted into electrical energy. Sources that have been explored for harvesting are wind, temperature differences, motion, light energy and radio frequency energy. In all these energy situations, a specific situation must be present, such as air flow, temperature gradient, movement, sunlight, or transmitted RF, before energy can be harvested. When these situations do not occur, there is no source for energy to be harvested.

Harvesting ambient thermal energy has not been widely explored. The characteristic of thermal energy having a peak at long infrared wavelengths poses a significant challenge for harvesting. Additionally, power management, storage control, and regulation electronics must be developed to operate efficiently and respond to the power output demand.

DETAILED DESCRIPTION

Reference is made in detail to the preferred embodiments of the invention. While the invention is described in conjunction with the preferred embodiments, the invention is not intended to be limited by these preferred embodiments. The contemplated embodiments for carrying out the present invention are described in turn with reference to the accompanying figures.

For purposes of the invention, radiation is defined to be the electromagnetic spectrum, particularly the near ultraviolet, visible, near infrared, short-wave infrared, mid-wave infrared, long-wave infrared and far infrared bands. The near ultraviolet band is comprised of wavelengths from about 300 to 400 nm. The visible light band is comprised of wavelengths from about 400 to 780 nm. The near infrared band is comprised of wavelengths from about 0.78 to 1 $\mu$m. The short-wave infrared band is comprised of wavelengths from about 1 to 3 $\mu$m. The mid-wave infrared band is comprised of wavelengths from about 3 to 6 $\mu$m. The long-wave infrared band is comprised of wavelengths from about 6 to 14 $\mu$m. The far infrared band is comprised of wavelengths from about 14 to 40 $\mu$m. However, the boundary between near ultraviolet radiation and visible light along with the boundary between visible light and infrared radiation is not precisely defined, resulting in overlap between the bands.

The term electrically connected is defined to encompass an electrical current flow, including bidirectional, unidirectional, or any hybrid current flow, such as an uneven current.

Figure 1A:
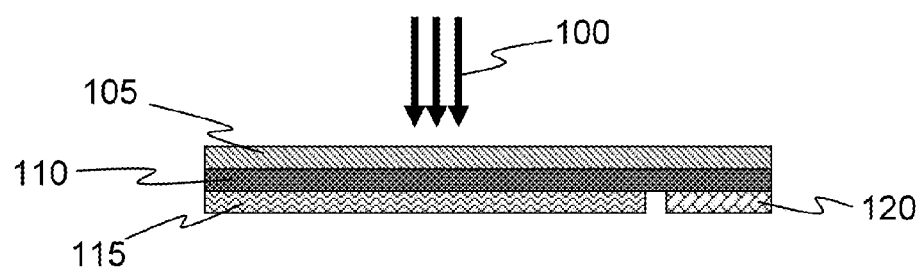
FIGS. 1A and B depicts a high level structural representation of an energy harvesting system.
Figure 1B:
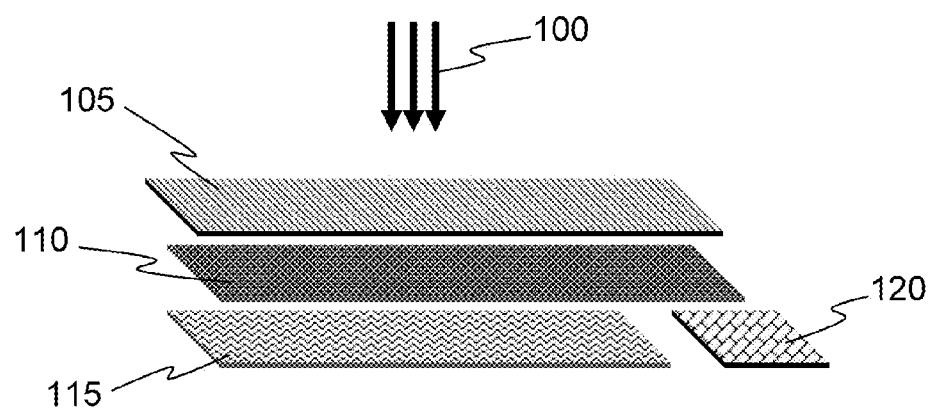

FIG. 1 depicts a high level structural configuration for an energy harvesting system. FIG. 1A illustrates a cross section of the structural configuration. FIG. 1B shows an exploded three dimensional view. The interconnects and electrodes in the structural configurations depicted in FIGS. 1A and B are not shown.

The energy harvesting system comprises a solar harvester 105, a thermal harvester 110, a battery 115, and harvester electronics 120. The thermal harvester 110 is located between the solar harvester 105 and the battery 115. The harvester electronics 120 is attached to the thermal harvester 110 on the same side as the battery 115. The solar harvester 105 and thermal harvester 110 are electrically isolated from each other and individually electrically connected to the harvester electronics 120. The battery 115 is electrically connected to the harvester electronics 120.

The solar harvester 105 and the thermal harvester 110 may be comprised of a photovoltaic or photoelectrochemical system. The solar harvester 105 may include any photovoltaic system which absorbs radiation within the near ultraviolet, visible, or near infrared bands to generate power. The solar harvester 105 may be comprised of any type of solar cell, including traditional crystallized silicon solar cells, thin film solar cells, multi-layered solar cells, dye sensitized solar cells, or organic polymer solar cells. The material comprising the solar harvester may include, but is not limited to, amorphous silicon, polysilicon, crystalline silicon, Ge, SiGe, CdTe, ZnO, CdZnTe, HgCdTe, HgZnTe, GaAs, GaN, InP, GaSb, InSb, other semiconductors, light sensitive dyes, or polymers. A photovoltaic thermal harvester 105 may be comprised of a single junction or multiple junctions. The material comprising the thermal harvester 105 may include HgCdTe, HgZnTe, InSb, InAs, GaSb, GaAs, InP, PbTe, or polymers.

The battery 115 may be any type of rechargeable battery. One embodiment of the invention contemplates the use of solid state thin film battery may be comprised of lithium-ion polymer, lithium, semiconductor, polymer, or flexible batteries. Optionally, the solid state thin film battery may be discretely or monolithically integrated with the harvester. Optionally, in a separate embodiment, bulk batteries may be used. For example, rechargeable lithium air, nickel-cadmium, or nickel metal-hydride batteries. Optionally, a single or multiple battery cells may be used. Optionally, in the case of multiple battery cells, the cells may be arranged in various configurations, e.g. series, parallel, etc. The battery 115 may be flexible, semi-flexible, or rigid. The battery 115 is electrically connected to the harvester electronics 120.

The harvester electronics 120 may be comprised of circuitry which regulates the rate of charge and voltage level of the battery along with regulating the output of power to a load. In one embodiment of the invention, the harvester electronics may be comprised of a single chip integrated circuit. Optionally, the integrated circuits may be a CMOS circuit. Alternatively, an FPGA may be used for harvester electronics 120 to be configurable in the field. Optionally, the harvester electronics may be discretely integrated with the battery 115. The harvester electronics may be flexible, semi-flexible, or rigid. The harvester electronics 120 may be powered by the battery 115, energy from the solar harvester 105 or thermal harvester 110, or a combination of energy sources.

The system is oriented to absorb radiation 100 arriving from the indicated direction, passing through the solar harvester 105 before reaching the thermal harvester 110. The radiation 100 is comprised of the near ultraviolet, visible, near infrared, short-wave infrared, mid-wave infrared, long-wave infrared, and far infrared bands.

Figure 2:
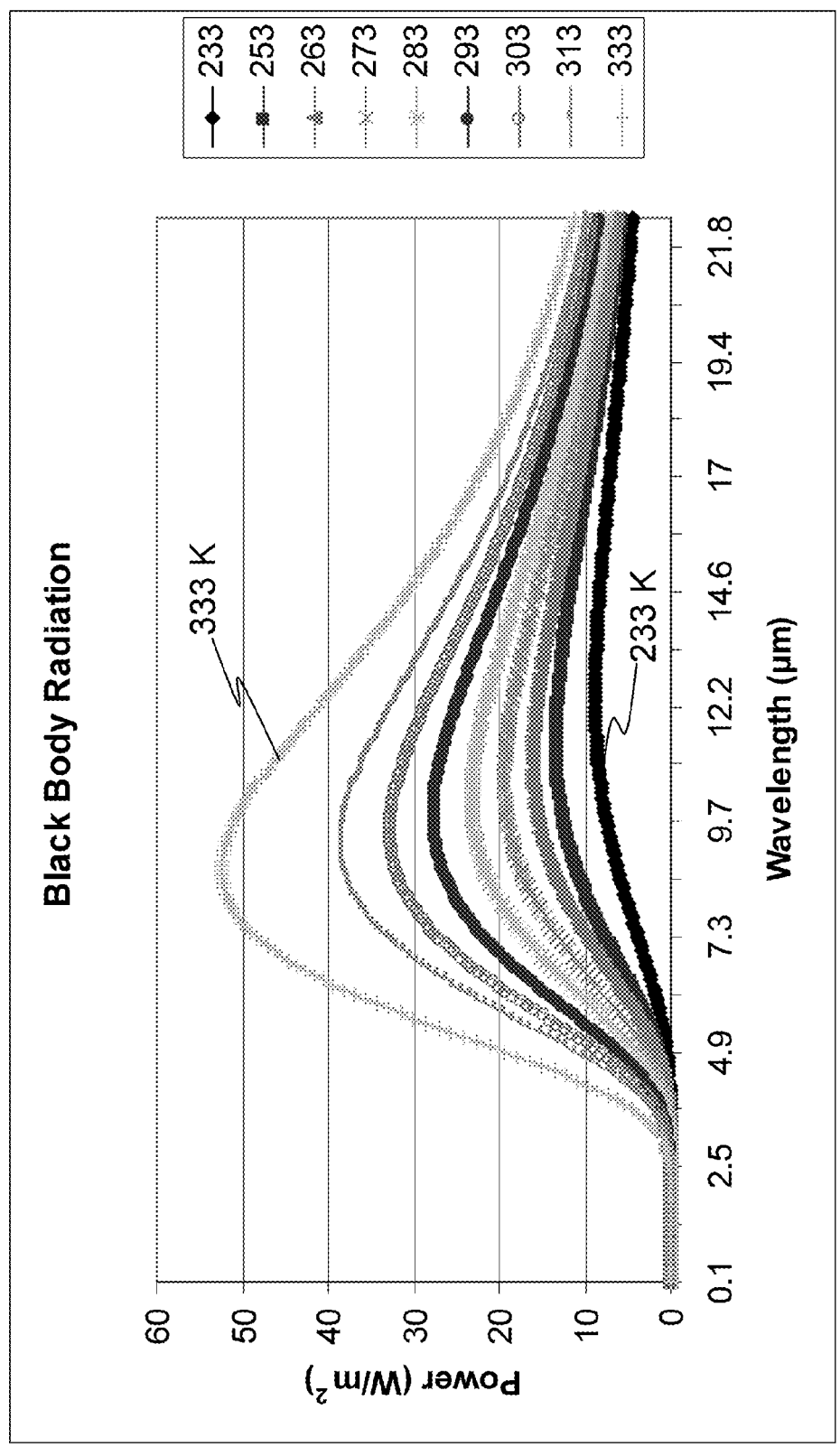
FIG. 2 depicts power available from blackbody radiation at various temperatures

FIG. 2 illustrates the blackbody power as a function of wavelength at various temperatures. The blackbody radiation spectrum ranges from near ultraviolet to the infrared spectrum. Blackbody radiation has been largely overlooked as a potential energy source.

Blackbody radiation is a physical effect in which all objects at temperatures above 0 K emit electromagnetic power. The spectral radiance of an object is described through Planck's Law, which is presented as, $$I(\lambda) = \frac{2hc^2}{\lambda^5 \left(e^{\frac{hc}{\lambda kT}} - 1\right)},$$

where c is the speed of light, k is Boltzmann's constant, h is Planck's constant, λ is wavelength, and T is temperature in Kelvin of the object. By applying Lambert's cosine law to a hemispherical flux density from a flat surface, the maximum amount of incident radiation is equal to πI. This yields a maximum spectral radiance of $$I(\lambda) = \frac{2\pi hc^2}{\lambda^5 \left(e^{\frac{hc}{\lambda kT}} - 1\right)},$$

which best models the intensity of radiation from a planar source. As temperature increases, power (in watts per meters squared) increases at lower wavelengths. This results in the peak shifting towards lower wavelengths at higher temperatures.

As shown in FIG. 2, at the temperatures ranging from −40° C. (233 K to +60° C., the peak power is at about 9 μm wavelength. Using Stefan-Boltzmann's law, $5.67 \times 10^{-8} \times T^4$, the total available blackbody radiation at a given temperature can be calculated. At room temperature, about 293 Kelvin, the total available blackbody radiation is estimated to be 413 W/m² with a peak between 7 to 10 μm.

Figure 3:
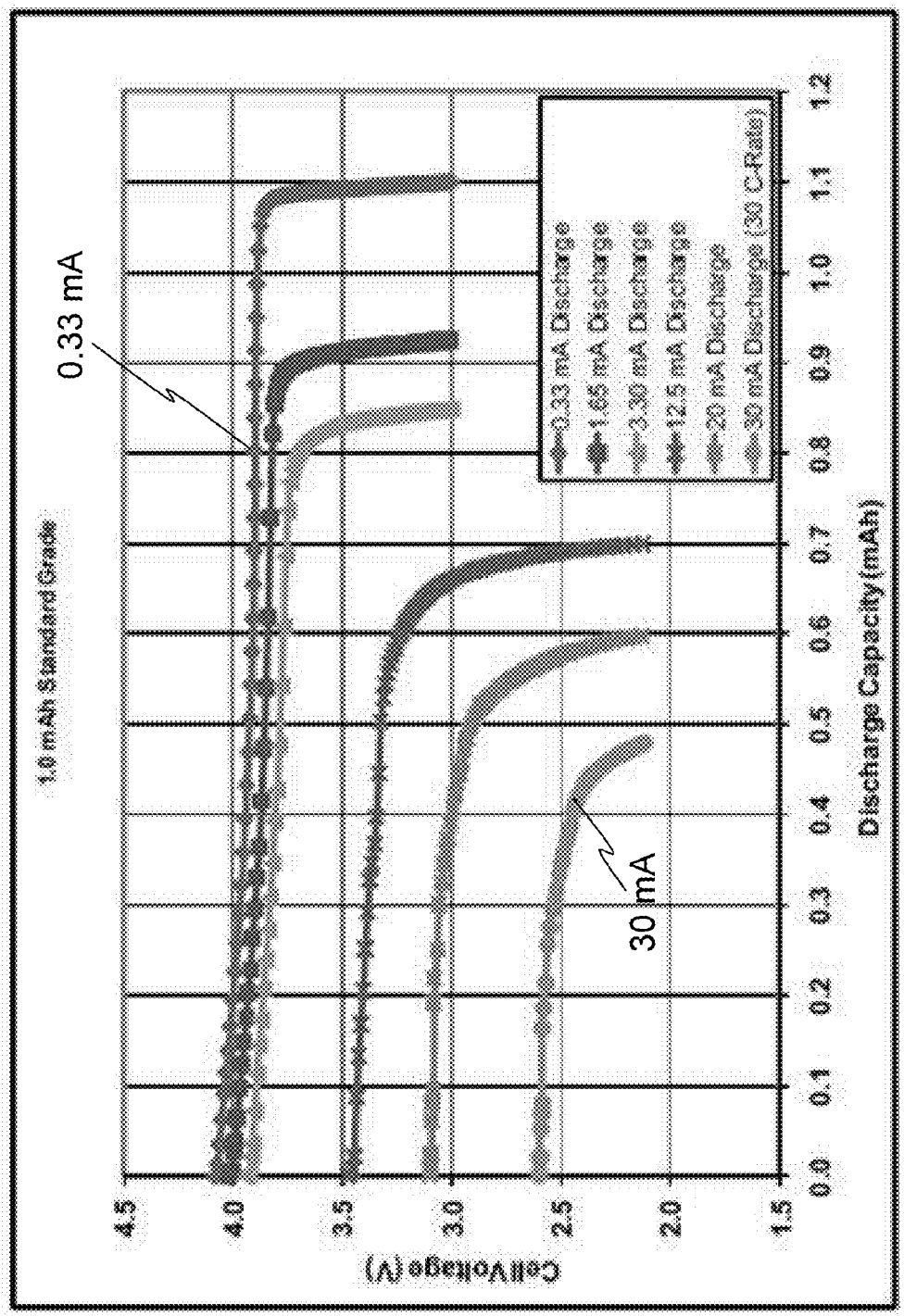
FIG. 3 depicts the discharge characteristics of a lithium ion battery.

FIG. 3 illustrates the discharge characteristics of a lithium-ion polymer cell at various currents. The figure shows that the cell maintains a relatively constant voltage, which drops sharply as the current decreases due to the battery's inherent resistance increasing. Given this characteristic of lithium-ion polymer cells, completely discharging cells, otherwise known as deep discharge, results in damage to the cells, which may include the inability to hold a charge and sustain a voltage across a load. To guard against this damage, low voltage protection is required. While the figure illustrates the characteristics for a 1.0 mAh grade lithium-ion polymer cell, the characteristics are similar for other lithium-ion polymer cells.

Figure 4:
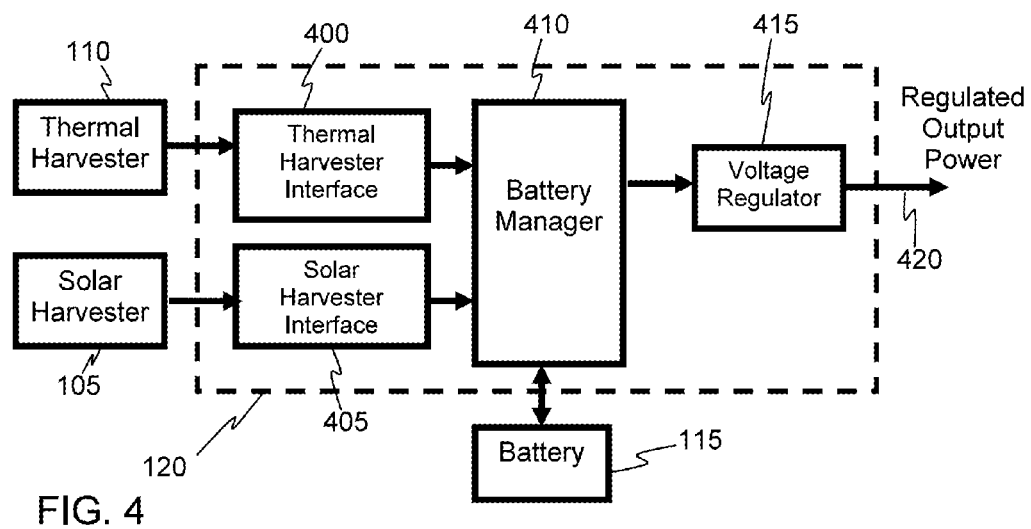
FIG. 4 depicts a block diagram of the harvester electronics utilizing a dual circuit design.

FIG. 4 illustrates a block diagram of the harvester electronics 120 utilizing a two circuit configuration. The harvester electronics 120 are comprised of a thermal harvester interface 400, a solar harvester interface 405, a battery manager 410, and a voltage regulator 415. Each component comprising the harvester electronics 120 may be electrically connected to and powered by the battery 115. Optionally, the components of the harvester electronics 120 may be powered by the energy from the solar or thermal harvesters. Optionally, a combination of energy sources may be used to power the harvester electronics 120. For example, the harvester electronics 120 may be powered by energy from the solar harvester 105 and the battery 115.

The solar harvester 105 is electrically connected to the solar harvester interface 405. The solar energy harvested by the solar harvester 105 is transferred to the solar harvester interface 405. Optionally, the solar harvester interface may comprise a voltage boost to allow harvesting of solar energy at low voltages. Optionally, the voltage boost may be dynamically triggered below a certain threshold. The solar harvester interface is electrically connected to the battery manager 410.

The thermal harvester 110 is electrically connected to the thermal harvester interface 400. The thermal energy harvested by the thermal harvester 110 is transferred through the thermal harvester interface 400. Due to the low voltage output of thermal energy, the thermal harvester interface 400 comprises a voltage boost. For example, the voltage boost may boost voltages from as low as 20 mV. The thermal harvester interface 400 is electrically connected to the battery manager 410.

The solar harvester interface 405 and the thermal harvester interface 400 transfer the harvested energy to the battery manager 410. The battery manager 410 merges the harvested energy from the solar harvester interface 405 and the thermal harvester interface 400. This merged energy may be used to charge the battery 115 and/or be supplied to the electrically connected voltage regulator 415. The battery manager 410 controls the rate of charge for the battery 115. The rate of charge varies depending on the battery requirements. The battery manager 410 may be configured to disconnect the battery 115 from the output load when the battery discharge reaches a voltage threshold where further discharge would be harmful to the battery. The voltage at which the battery manager 410 disconnects the battery varies depending on the battery specifications and configuration. For example, if the battery 115 is a lithium-ion polymer with discharge characteristics shown in FIG. 3, the battery manager 410 will disconnect the battery from the load when the sharp voltage drop occurs. For example, but not to serve as a limitation, if the battery 115 is a 3.3 V lithium polymer battery, the battery manager 410 may be disconnect the battery from the load when the battery output voltage reaches 2.1 V. While the battery 115 is disconnected from the load, the battery manager 410 may continue to charge the battery 115 while providing power to the voltage regulator 415.

Optionally, the battery manager 410 may include cell balancing capability when multiple battery cells are used. In the case where the battery cells have the same capacity, the battery manager 410 may differentially charge each cell to maximum capacity. In the case where the battery cells have varying capacities, the battery manager 410 may differentially charge each cell to maintain the same state of charge.

The battery manager 410 may be configured to disconnect the battery 115 when the battery is fully charged to prevent overcharging. In the situation where the battery 115 is fully charged and disconnected from further charging, the battery manager 410 will direct all the harvested energy to the voltage regulator 415. In the absence of adequate power from the solar harvester 105, the battery manager 410 may utilize the battery 115 to supplement power from the thermal harvester 110 to the voltage regulator 415.

The voltage regulator 415 maintains a constant voltage level output, which enables the harvester electronics 120 to produce a regulated power output 420. The voltage regulator 415 may be comprised of a Low Drop Out (LDO) DC-DC voltage regulator. Optionally, other linear voltage regulators or switching regulators may be used. For example, but not to serve as a limitation, other linear voltage regulators may comprise zener regulators, series regulators, transistor regulators, or regulators comprising an op-amp. The voltage regulator 415 may be modular and configured to match a specific range of output loads or increase power output drive capability.

Optionally, the components of the harvesting electronics may be specifically configured to efficiently supply adequate power depending on the specific applications. While the embodiment of the invention contemplates the harvester electronics 120 comprised on a single chip, alternate embodiments may comprise each block or a combination of two or more blocks as discrete circuits.

Figure 5:
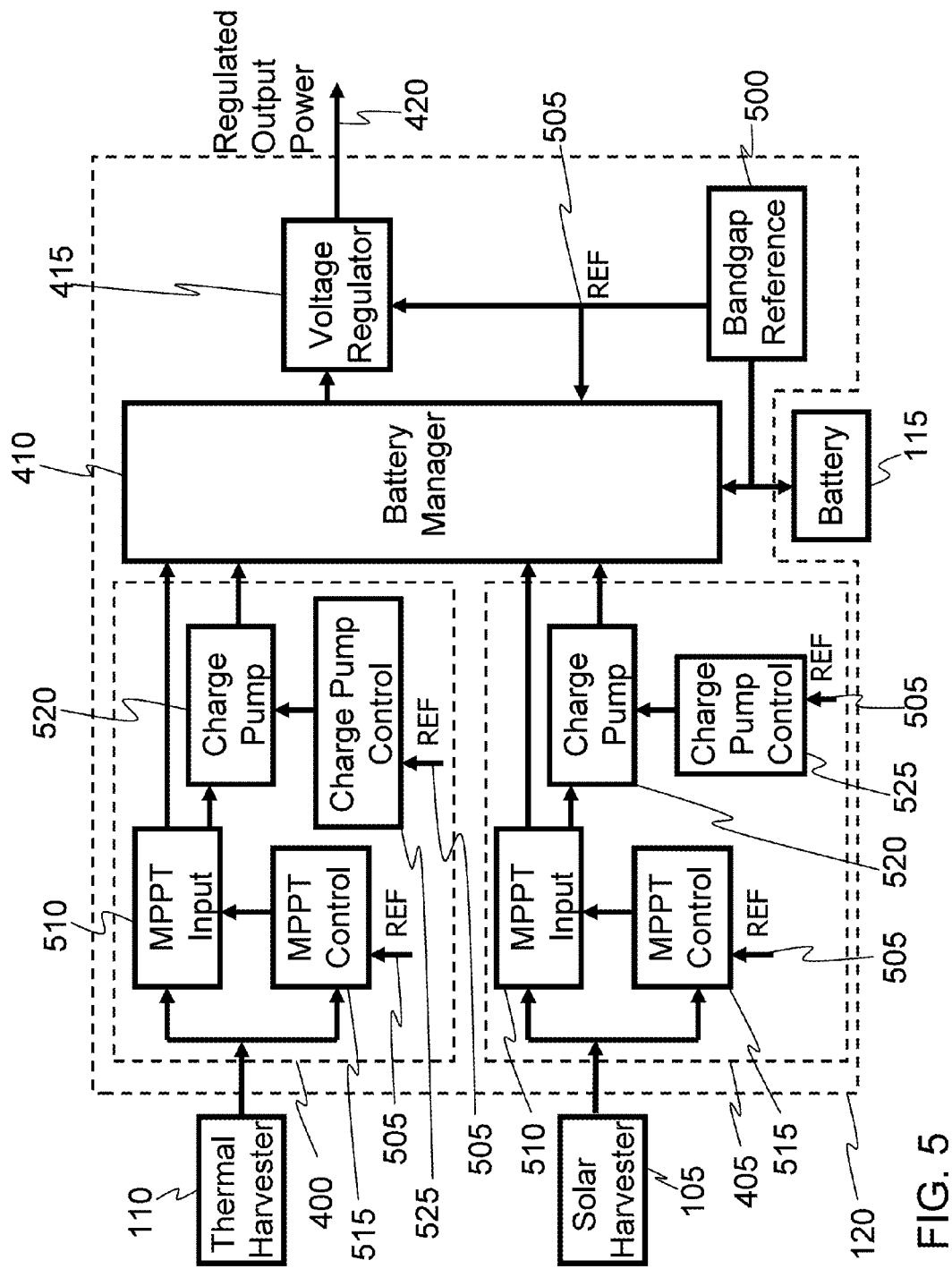
FIG. 5 depicts an alternate embodiment of a block diagram of the harvester electronics utilizing a dual circuit design.

FIG. 5 illustrates an alternate embodiment of the harvester electronics utilizing a two circuit configuration. The solar harvester 105, thermal harvester 110, battery 115, thermal harvester interface 400, solar harvester interface 405, battery manager 410, and voltage regulator 415 are as described above in FIG. 1 and FIG. 4.

The harvester electronics comprises a bandgap reference 500. The bandgap reference 500 is electrically connected to and powered by the battery 115. Optionally, the bandgap reference may be powered separately by the battery manager, not shown. The bandgap reference 500 provides a temperature independent voltage reference (REF) 505. The bandgap reference is electrically connected to the battery manager 410 and voltage regulator 415, along with the MPPT controls and charge pump controls comprising the thermal harvester interface 400 and solar harvester interface 405 and outputs the REF 505 to each of the components.

The solar harvester interface 405 and thermal harvester interface 400 may be further comprised of individual maximum power point tracking (MPPT) inputs 510, MPPT controls 515, charge pumps 520, and charge pump controls 525. The different harvesting conditions for solar and thermal harvesters may result in different circuitry comprising the aforementioned components. The aforementioned components comprising the individual harvester interfaces may be powered by the battery 115. Optionally, the components may be powered by the battery manager 410 or the solar or thermal harvester.

The MPPT input 510 is electrically connected to and receives input from the solar or thermal harvester and MPPT control 515. The MPPT input 510 may track to match the input impedance to the maximum harvesting input impedance to achieve the greatest possible power harvest, during moment to moment variations of light level, shading, temperature, and photovoltaic module characteristics based on the input from the MPPT control 515.

The MPPT control 515 is electrically connected to and receives input from the solar or thermal harvester and bandgap reference 500. The input from the bandgap reference 500 comprises the REF 505. The MPPT control 515 indicates to the MPPT input 510 whether the operating voltage of the harvesting input has changed in a given direction and to adjust the impedance accordingly. Optionally, the MPPT control 515 may determine the disturbance of the operating voltage of the harvesting input through a logic algorithm utilizing the REF 505 and harvester inputs. The MPPT input 510 is electrically connected to and provides an output to the battery manager 410.

Optionally, the MPPT input 510 may be electrically connected to the charge pump 520. The charge pump 520 is electrically connected to and receives input from the MPPT input 510 and the charge pump control 525. The charge pump 520 may be comprised of a capacitive charge pump. Alternatively, the charge pump 520 may be comprised of a step-up converter, boost converter, boost converter, another type of DC-DC converter, or a DC-AC converter coupled to a voltage multiplier. Optionally, the charge pump 520 may be comprised of multiple stages. For example, the charge pump 520 may pump from a voltage as low as 20 mV to over 4 V, using multiple stages to achieve the result.

The charge pump control 525 is electrically connected to and receives input from the bandgap reference 500 in the form of REF 505. Based on the REF 505, the charge pump control 525 may adjust the oscillator frequency and the number of charge pump stages used by the charge pump 520, which may be none, one, or multiple stages.

In an embodiment where the components of the harvester electronics 120 is powered by the battery 115, the output from the MPPT input 510 to the battery manager 410 may serve as a bypass in the situation where the battery 115 goes below the harvester electronics 120 operating voltage. If the battery 115 goes below the harvester electronics 120 operating voltage, the components may fail to function. This bypass may allow the battery manager to recover the device with a voltage input that could drive the harvest electronics 120 and charge the battery 115 above the minimum operating voltage.

While the embodiment of the invention contemplates the harvester electronics 120 comprised on a single chip, alternate embodiments may comprise each block or a combination of two or more blocks as discrete circuits.

Figure 6:
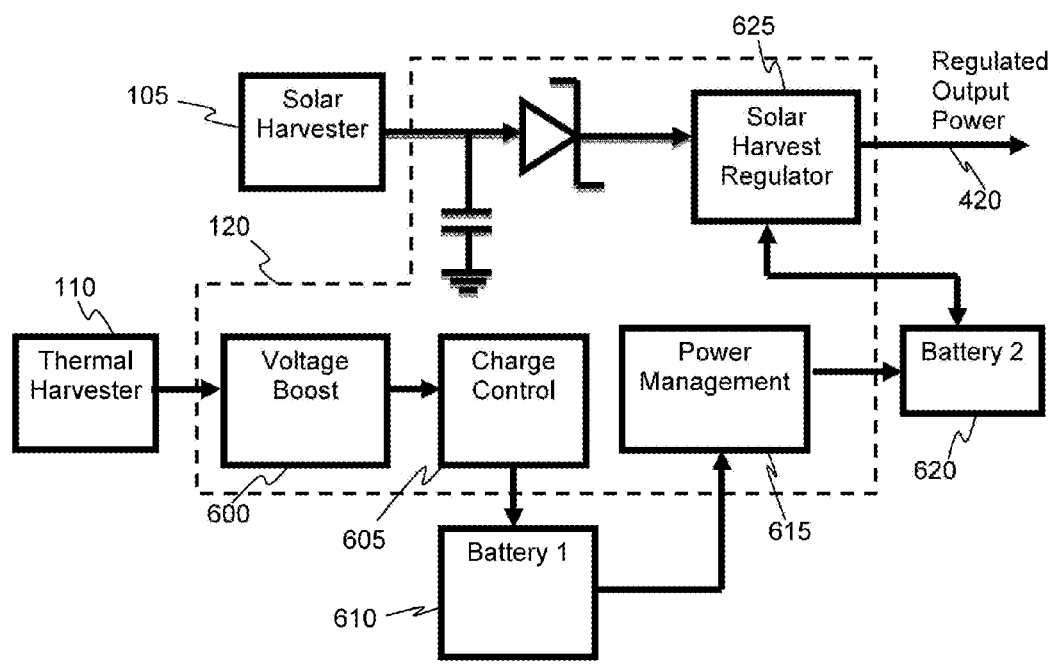
FIG. 6 depicts a block diagram of the harvester electronics utilizing a single circuit design.

FIG. 6 illustrates a block diagram embodiment of the harvester electronics 120 in a single circuit configuration. The thermal harvester 110 is electrically connected to a voltage boost 600. The voltage boost 600 may be comprised of a capacitive charge pump. Alternatively, the voltage boost 600 may be comprised of a step-up converter, boost converter, boost converter, another type of DC-DC converter, or a DC-AC converter coupled to a voltage multiplier. The voltage boost increases the low voltage input from the thermal harvester. The voltage boost 600 is electrically connected to the charge control 605. The charge control 605 controls the energy storage for a first battery 610. The boosted energy from the thermal harvester 110 is used to charge the first battery 610. The charge control 605 controls the rate of charge and the battery voltage level of the first battery 610. When the first battery 610 is fully charged, the charge control 605 disconnects the battery to prevent overcharging.

The first battery 610 may be comprised of any type of rechargeable battery. One embodiment of the invention contemplates the use of solid state thin film battery may be comprised of lithium-ion polymer, lithium, semiconductor, polymer, or flexible batteries. Optionally, the solid state thin film battery may be discretely or monolithically integrated with the harvester. Optionally, in a separate embodiment, bulk batteries may be used. For example, rechargeable lithium air, nickel-cadmium, or nickel metal-hydride batteries. Optionally, the first battery 610 may be comprised of single or multiple battery cells.

The first battery 610 is electrically connected to the power management block 615. The power management block disconnects the first battery 610 from the output load when the battery when the battery discharge reaches a voltage threshold where further discharge would be harmful to the battery. For example, if the first battery 610 comprises a lithium-ion polymer battery with discharge characteristics similar to the depiction in FIG. 3, the power management block 615 will disconnect the battery from the load when the sharp voltage drop occurs. Additionally, the power management 615 is electrically connected to a second battery 620. The power management block 615 regulates the output voltage of the first battery 610 to charge the second battery 620. Optionally, the charge control 605 and the power management block 615 may be combined into a single block to regulate the storage and output of the first battery 610.

The second battery 620 may be comprised of any type of rechargeable battery. One embodiment of the invention contemplates the use of a solid state thin film battery comprised of lithium-ion polymer, lithium, semiconductor, polymer, or flexible batteries. Optionally, the solid state thin film battery may be discretely or monolithically integrated with the harvester. Optionally, in a separate embodiment, bulk batteries may be used. For example, rechargeable lithium air, nickel-cadmium, or nickel metal-hydride batteries. Optionally, the second battery 620 may be comprised of single or multiple battery cells. The second battery 620 is electrically connected to and receives solar energy input from the solar harvest regulator 625.

The solar harvest regulator 625 is electrically connected to and receives input from the solar harvester 105. Optionally, a zener protection diode may be used between the solar harvester 105 and solar harvest regulator 625 to protect the entire circuit. The solar harvest regulator 625 may comprise a mechanism to disconnect the second battery 620 once the battery reaches a full charge to prevent overcharging. Optionally, the solar harvest regulator 625 may be electrically connected to the voltage boost 600 and receives harvested thermal energy. Additionally, the solar harvest regulator 625 may comprise a voltage output regulator to disconnect the output when the battery discharge reaches a voltage threshold where further discharge would be harmful to the battery. Optionally, the solar harvest regulator may comprise a LDO regulator, another type of linear voltage regulator, or a switching regulator to control the output to a load. For example, but not to serve as a limitation, other linear voltage regulators may comprise zener regulators, series regulators, transistor regulators, or regulators comprising an op-amp. Optionally the solar harvest regulator 625 may protect the second battery 620 from unintended discharge when the input is lower than the battery voltage. For example, a zener protection diode may be used as a mechanism, where the voltage of the solar input must match the voltage of the battery plus the zener diode voltage.

While the embodiment of the invention contemplates the harvester electronics 120 comprised on a single chip, alternate embodiments may comprise each block or a combination of two or more blocks as discrete circuits.

Figure 7:
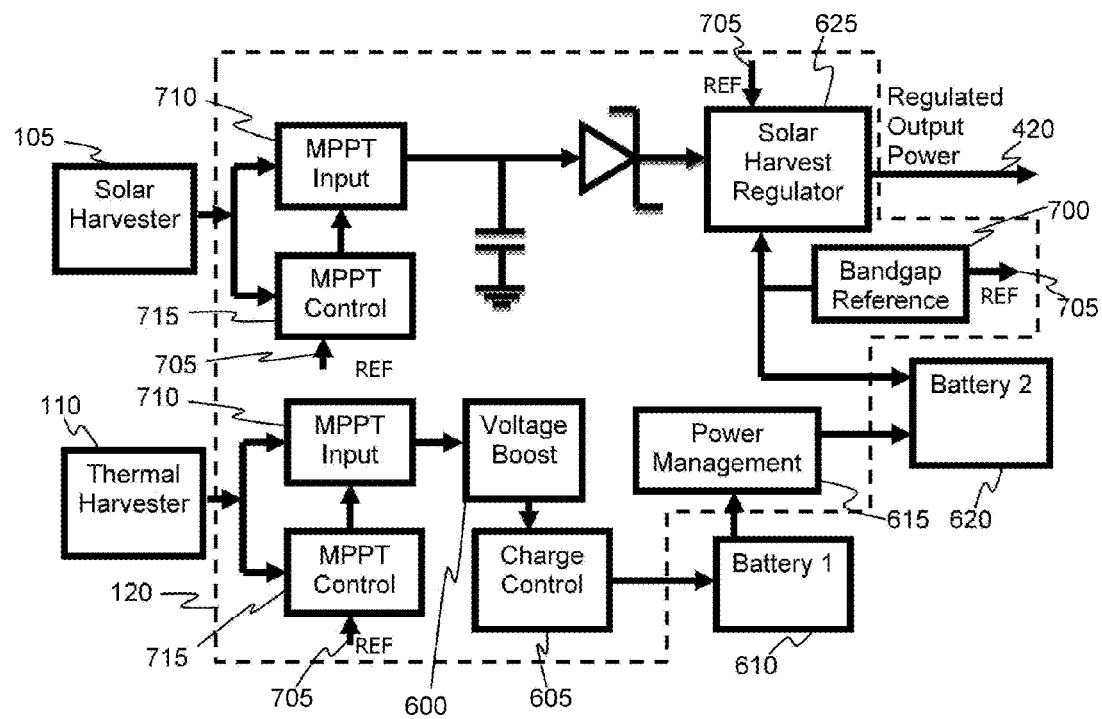
FIG. 7 depicts an alternate embodiment of a block diagram of the harvester electronics utilizing a single circuit design.

FIG. 7 illustrates an alternate block diagram embodiment of the harvester electronics 120 in a single circuit configuration. The harvester electronics comprises a bandgap reference 700. The bandgap reference 700 is electrically connected to and powered by the second battery 620. Optionally, the bandgap reference may be powered separately by the solar harvest regulator 625, not shown. The bandgap reference 700 provides a temperature independent voltage reference (REF) 705 output. The bandgap reference is electrically connected to the solar harvest regulator 625 and the MPPT control 715 for the thermal and solar harvester inputs and outputs the REF 505 to each of the components.

The MPPT input 710 is electrically connected to and receives input from the solar or thermal harvester and MPPT control 715. The MPPT input 710 may track to match the input impedance to the maximum harvesting input impedance to achieve the greatest possible power harvest, during moment to moment variations of light level, shading, temperature, and photovoltaic module characteristics based on the input from the MPPT control 715.

The MPPT control 715 is electrically connected to and receives input from the solar or thermal harvester and bandgap reference 700. The input from the bandgap reference 700 comprises the REF 705. The MPPT control 715 indicates to the MPPT input 710 whether the operating voltage of the harvesting input has changed in a given direction and to adjust the impedance accordingly. Optionally, the MPPT control 715 may determine the disturbance of the operating voltage of the harvesting input through a logic algorithm utilizing the REF 705 and harvester inputs.

Optionally, in another embodiment of the invention, a second bandgap reference, not shown, may be connected to the charge control 605 and the first battery 610. The second bandgap reference is electrically connected to and provides a reference output to the MPPT control 715 connected to the thermal harvester 110. This embodiment allows for individual MPPT tracking for different sources of harvested energy.

While the embodiment of the invention contemplates the harvester electronics 120 comprised on a single chip, alternate embodiments may comprise each block or a combination of two or more blocks as discrete circuits.

While the aforementioned embodiments depict harvesting electronics which control the storage of energy and regulate output to a load for solar and thermal harvesters, the harvesting electronics may be configured to receive input from multiple sources of energy harvesting. Examples of other sources may include, but are not limited to, air flow, temperature gradient, movement and transmitted radio frequencies.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

The embodiments were chosen and described in order to explain the principles and applications of the invention, thereby allowing others skilled in the art to utilize the invention in its various embodiments and modifications according to the particular purpose contemplated. The scope of the invention is intended to be defined by the claims appended hereto and their equivalents.

The expected practical use of the present invention is the novel integrated perpetual energy harvester with energy storage and harvesting electronics. The proposed invention may be used as a one chip solution to store power from multiple sources of energy harvesting and regulate the output to a load.

What is claimed is:

1. A harvesting system comprising:
   at least one energy harvester;
   at least one energy storage device, and;
   a harvesting electronics system comprising,
      at least one energy harvester interface,
         wherein the at least one energy harvester interface connects to at least one energy harvester;
      at least one energy storage interface,
         wherein the at least one energy storage interface in connected to the at least one energy storage devices;
      at least one output load interface;
      a regulating circuit wherein the regulating circuit is electrically connected to the at least one energy storage interface and the at least one load interface, and;
      a power management element, wherein the power management element is electrically connected to the at least one energy storage interface, wherein the power management element configured to receive a signal corresponding to a level of energy in the energy storage device, and wherein the power management element disconnects the at least one energy storage device after fully charged and directs all the harvested energy to the regulating circuit;
   wherein the harvesting electronics system is embodied within a module.

2. The harvesting system in claim 1, wherein said at least one energy storage device comprises one or more batteries wherein said one or more batteries are selected from the group consisting of thin film lithium-ion, lithium-ion polymer, polymer, semiconductor, flexible, rigid, lithium, lithium air, nickel-cadmium, and nickel metal-hydride batteries.

3. The harvesting system in claim 1, wherein the at least one energy harvester comprises at least one solar harvester, wherein said at least one solar harvester is selected from the group consisting of traditional crystallized silicon solar cells, thin film solar cells, multi-layered solar cells, dye sensitized solar cells, and organic polymer solar cells.

4. The harvesting system in claim 1, wherein the at least one energy harvester comprises at least one thermal harvester, wherein said the at least one thermal harvester is selected from a group of materials consisting of HgCdTe, HgZnTe, InSb, InAs, GaSb, GaAs, InP, PbTe, and polymers.

5. The harvesting system in claim 1, wherein the at least one energy harvester interface further comprises a zener diode.

6. The harvesting system in claim 1, is embodied on one integrated module.

7. The harvesting electronics system in claim 1, is embodied into one integrated circuit.

8. A harvesting system comprising:
   at least one energy harvester;
   at least one energy storage device, and;
   a harvesting electronics system comprising,
      at least one energy harvester interface,
         wherein the at least one energy harvester interface connects to at least one energy harvester;
      at least one energy storage interface,
         wherein the at least one energy storage interface in connected to at least one energy storage devices;
      at least one output load interface;
      a regulating circuit, wherein the regulating circuit is electrically connected to the at least one energy storage interface and the at least one load interface;
      a power management element, wherein the power management element is electrically connected to the at least one energy storage interface, wherein the power management element configured to receive a signal corresponding to a level of energy in the energy storage device, and;
      at least one bandgap reference electrically connected to the at least one energy harvester.

9. The harvesting system in claim 8, wherein the at least one energy harvester comprises a at least one solar harvester, or at least one thermal harvester or a combination of both.

10. The harvesting system in claim 9, wherein the said at least one thermal harvester generates electrical energy from blackbody radiation.

11. The harvesting system in claim 8, wherein the at least one energy harvester interface further comprises a Maximum Power Point Tracking (MPPT) element electrically connected to the at least one energy harvester, wherein the MPPT element receives an energy from the at least one energy harvester.

12. The harvesting system in claim 8, wherein said at least one energy storage device comprises one or more batteries wherein said one or more batteries are selected from the group consisting of thin film lithium-ion, lithium-ion polymer, polymer, semiconductor, flexible, rigid, lithium, lithium air, nickel-cadmium, and nickel metal-hydride batteries.

13. The harvesting system in claim 8, is embodied on one integrated module.

14. A harvesting system comprising:
   at least one energy harvester;
   at least one energy storage device, wherein the at least one energy storage device comprises of at least one battery and;
   a harvesting electronics system comprising,
      at least one energy harvester interface;
         wherein the at least one energy harvester interface connects to at least one energy harvester;
      at least one energy storage interface;
         wherein the at least one energy storage interface in connected to at least one energy storage devices;
      at least one output load interface;
      a regulating circuit, wherein the regulating circuit is electrically connected to the at least one energy storage interface and the at least one load interface;
      a power management element, wherein the power management element is electrically connected to the at least one energy storage interface, wherein the power management element configured to receive a signal corresponding to a level of energy in the energy storage device, and wherein the power management element disconnects the at least one energy storage device after fully charged and directs all the harvested energy to the regulating circuit;

at least one DC-DC converter, or at least one DC-AC converter, wherein the harvesting electronics system is embodied within a module.

15. The harvesting system in claim 14, wherein said at least one energy storage device comprises one or more batteries wherein said one or more batteries are selected from the group consisting of thin film lithium-ion, lithium-ion polymer, polymer, semiconductor, flexible, rigid, lithium, lithium air, nickel-cadmium, and nickel metal-hydride batteries.

16. The harvesting system in claim 14, wherein the at least one energy harvester comprises at least one solar harvester, wherein said at least one solar harvester is selected from the group consisting of traditional crystallized silicon solar cells, thin film solar cells, multi-layered solar cells, dye sensitized solar cells, and organic polymer solar cells.

17. The harvesting system in claim 14, wherein the at least one energy harvester comprises at least one thermal harvester, wherein said at least one thermal harvester is comprised of material selected from the group consisting of HgCdTe, HgZnTe, InSb, InAs, GaSb, GaAs, InP, PbTe, and polymers.

18. The harvesting system in claim 14, wherein the at least one energy harvester interface further comprises a Maximum Power Point Tracking (MPPT) element electrically connected to the at least one energy harvester, wherein the MPPT element receives an energy from the at least one energy harvester.

19. The harvesting system in claim 14, wherein the at least one energy harvester is integrated into the same circuit as the harvesting electronics system.

20. The harvesting system in claim 19, wherein the at least one energy storage device is integrated into the harvesting electronics system.

* * * * *